United States Patent [19]
Buseth et al.

[11] 4,007,909
[45] Feb. 15, 1977

[54] FULL FLOW VALVED FITTING

[75] Inventors: Richard A. Buseth, Jackson; Russell L. Rogers, Munith, both of Mich.

[73] Assignee: Aeroquip Corporation, Jackson, Mich.

[22] Filed: Oct. 16, 1975

[21] Appl. No.: 622,779

[52] U.S. Cl. .................... 251/149.2; 251/149.6; 285/316
[51] Int. Cl.$^2$ .................... F16L 29/00; F16L 37/28
[58] Field of Search ......... 251/149.2, 149.5, 149.6, 251/339; 137/614.02, 614.03, 614.04, 614.05, 527, 527.2, 527 A, 527.6; 285/277, 316

[56] References Cited
UNITED STATES PATENTS

| | | | |
|---|---|---|---|
| 586,618 | 7/1897 | Noll | 137/527 |
| 3,097,867 | 7/1963 | Saloum | 137/614.03 X |
| 3,127,148 | 3/1964 | Collar | 251/149.2 |
| 3,211,178 | 10/1965 | Kiszko | 137/614.04 |
| 3,613,726 | 10/1971 | Torres | 285/316 X |
| 3,754,564 | 8/1973 | Naumborg et al. | 251/149.2 X |
| 3,788,598 | 1/1974 | German et al. | 251/149.6 |

*Primary Examiner*—William R. Cline
*Attorney, Agent, or Firm*—Beaman & Beaman

[57] ABSTRACT

A coupling for handling liquids, gases, or a combination thereof characterized by its ability to convey high volumes with low flow resistance through valve elements. The coupling includes a pair of clam shell type valve elements pivotal between closed and open positions by the nose of the male coupling half during coupling of the halves and recesses defined in the valve elements receive the coupling nose so that the engagement between valve elements and coupling nose does not produce a flow restriction. The valve elements are provided with bonded resilient sealing edges and include a homogeneous bumper for absorbing shocks during coupling. A double action latch system is also disclosed having a sequence of operation which significantly reduces the likelihood of inadvertently uncoupling the coupling halves.

13 Claims, 10 Drawing Figures

FULL FLOW VALVED FITTING

BACKGROUND OF THE INVENTION

The invention pertains to self-sealing valved fluid couplings of the pivotal valve element type.

Self-sealing valved fluid couplings utilizing valve elements which automatically open upon connection of the coupling halves, and close upon coupling halves disengagement, are widely used in hydraulic systems and, in particular, hydraulic systems utilizing flexible hose lines. The valve elements of such couplings may constitute poppets, sleeves, spools, and pivotally mounted valves. One of the serious disadvantages of most self-sealing couplings lies in the high flow resistance produced due to the fact that the majority of self-sealing coupling constructions support the valve elements at the center of the flow passage requiring that the fluid flow through spiders and orifices when the valve is open, resulting in fluid flow resistance and pressure and capacity losses.

Those self-sealing fluid couplings producing minimum pressure loss during flow usually utilize pivotally mounted valve elements, such as shown in U.S. Pat. Nos. 586,618; 2,956,582 and 3,127,148. Such patents disclose fluid couplings having pivoted valve elements adapted to be engaged by an element during coupling and the valve elements pivot to an open position substantially removed from the flow path. However, such constructions often still produce slight restriction of the flow passage and, in the past, the valve elements were not of such configuration as to permit high capacities to be handled through the coupling and yet maintain the exterior diameter of the coupling to a size only slightly larger than the associated conduit, such as hose line.

Improved flow characteristics of pivoted valve elements have been achieved by shaping the cross-sectional configuration of the valve elements to substantially correspond to the transverse cross-sectional configuration of the flow passage. However, prior art devices have compromised the valve configuration in order to achieve acceptable flow characteristics and a desired sealing arrangement between the valve elements and, thus, flow passage restrictions often still occur through such couplings.

Also, while many self-sealing fluid couplings utilize locking ball detents and actuating sleeves to hold the coupling halves interconnected, such locking sleeves utilize an axial displacement upon the coupling for movement between coupled and uncoupled conditions. Thus, when the coupling is utilized with a hand-carried accessory, such as a nozzle or attachment fitting, it is possible to inadvertently displace the locking sleeve and prior art devices do not have effective safety arrangements to prevent such accidental actuation of the coupling latch structure.

BACKGROUND OF THE INVENTION

It is an object of the invention to provide a self-sealing fluid coupling capable of handling high flow capacities with a relatively concise diametrical configuration as compared with the conduit diameter wherein negligible flow restriction is present upon interconnection of the coupling halves.

A further object of the invention is to provide an improved valve element for clamshell or petal type fluid couplings wherein the valve element configuration is such that the inner surfaces thereof substantially correspond to the coupling flow passage when the valve element is in the fully open position.

A further object of the invention is to provide a valve element for clamshell type self-sealing couplings wherein a pair of valve elements are utilized which engage at a planar mating surface diametrically related to the flow passage and the valve elements also include a planar seating surface for cooperation with a coupling seat perpendicularly disposed to the flow path. The valve elements' mating surface and seating surfaces are perpendicularly disposed to each other, and resilient seals are bonded to these surfaces, a portion of the resilient seal material forming a bumper to absorb impact forces during valve element opening.

An additional object of the invention is to provide latch structure for two-part fluid couplings utilizing two axially displaceable detent operating sleeves wherein the sleeves are sequentially displaced in opposite directions in a predetermined sequence in order to permit uncoupling. The opposite direction of actuating movement of the latch sleeves substantially eliminating the likelihood of inadvertent coupling half disengagement.

In the practice of the invention the coupling halves basically consist of male and female elements, the male element including a nose received within recesses defined in pivoted valve elements mounted upon the female half. The nose of the male half pivots the valve elements from the closed position to the open position during coupling of the halves and locking ball detents, in conjunction with a locking sleeve, are utilized to maintain the coupled condition.

Two pivotally mounted valve elements are utilized, each valve element being of a tapered or conical segment configuration having an inner surface of a cylindrical segment form. The "nose" of the valve elements are exteriorly provided with a resilient material bonded thereto to form a bumper for absorbing shock during valve element opening and all sealing edges of the valve elements are provided with a flexible material to achieve effective fluid tight seals.

Inadvertent operation of the detent actuating latch sleeve is prevented by a safety locking sleeve having a direction of operation opposite that of the operating movement of the latch sleeve. The safety sleeve also uses roller ball detents cooperating with a cam surface defined upon the female body half wherein the balls thereof interfere with movement of the latch sleeve until the safety sleeve is sufficiently displaced to prevent such interference. The fact that the latch and safety sleeves must be sequentially moved in opposite directions substantially eliminates the likelihood of inadvertent uncoupling of the halves.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

Figure 1:
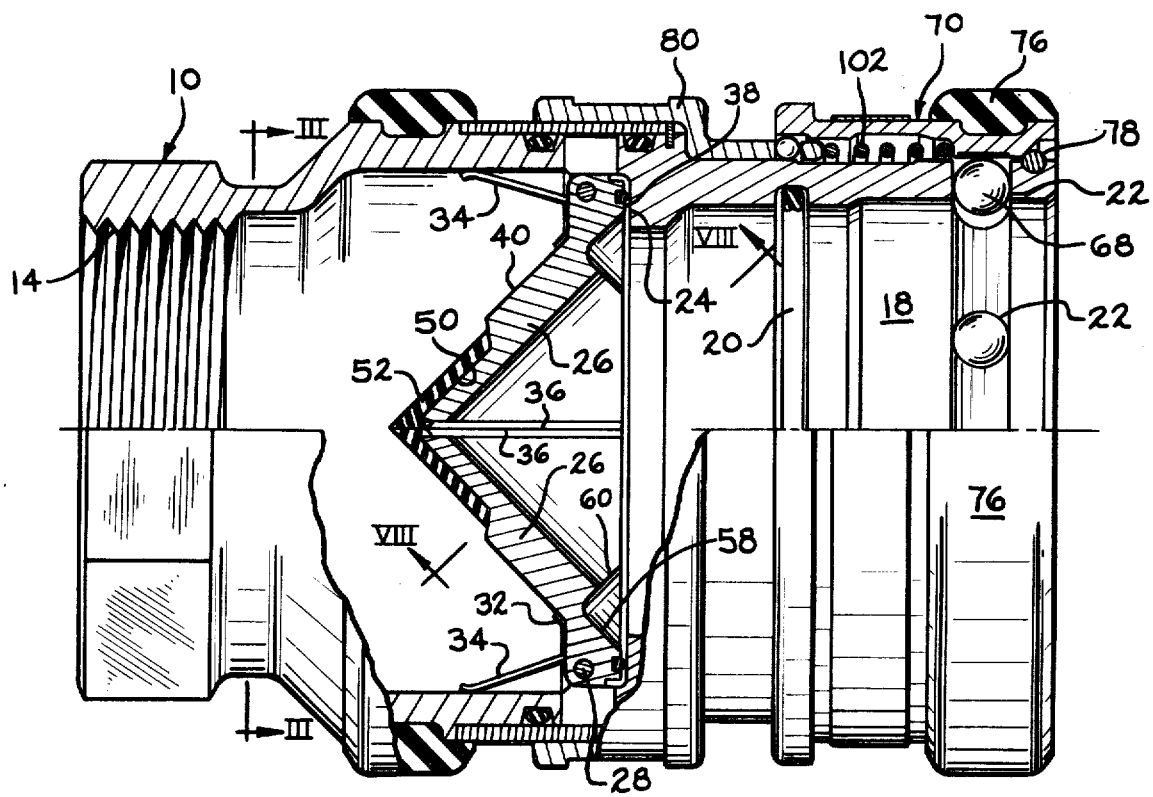
FIG. 1 is an elevational, diametrical, sectioned view, partially in elevation, of the coupling female half with the valve elements in the closed position.
Figure 2:
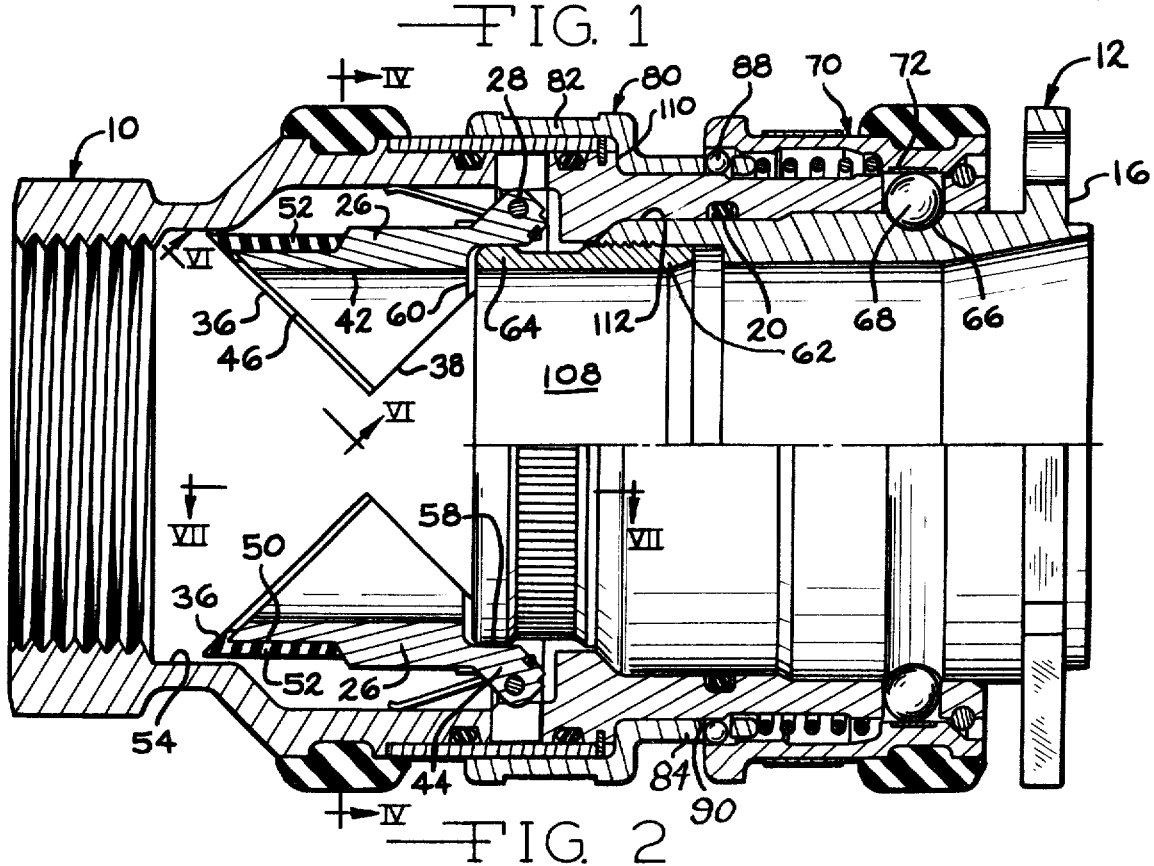
FIG. 2 is an elevational, diametrical, sectional view of a fluid coupling in accord with the invention illustrating the coupling halves fully interconnected and locked in coupled relationship.

The overall relationship of components of a coupling in accord with the invention is best appreciated from FIG. 2, and the details of construction of the female coupling half are also fully illustrated in FIG. 1. The coupling includes a tubular female body half 10 and a tubular male body half 12. In the illustrated embodiment the female half is internally threaded at 14 for attachment to a threaded adapter or other standard hose connection, and the male half includes a bolt-on type flange 16 whereby the male half may be attached to a tank or other receptacle, or may be bolted to known hose connections.

The female half 10 includes a cylindrical flow passage 18, FIG. 1, defined by cylindrical shouldered axially extending sections of variable diameter corresponding in configuration to the exterior surface of the male half 12, as apparent in FIG. 2. The passage is grooved to receive a sealing ring 20, and a plurality of radially extending tapered holes 22 are defined through the wall of the half for receiving latching ball detents, as will be later described.

An annular planar valve seat surface 24 is defined adjacent the passage 18 and a pair of valve elements 26 are pivotally mounted in half 10 upon pivot pins 28 for selectively controlling fluid flow through the half from left to the right, FIG. 1.

Pivot pins 28 are received within holes defined in the half 10, and a torsion spring 30 wrapped about each pivot pin includes an end 32 which bears against the valve element body and an end 34 engaging the passage of the half 10 to impose a biasing force upon the valve elements tending to close the same as shown in FIG. 1.

Figure 3:
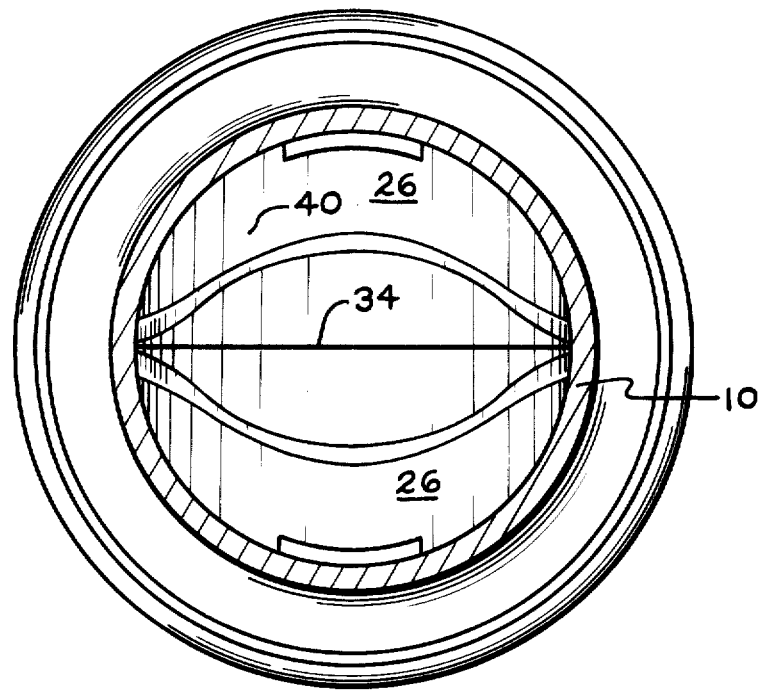
FIG. 3 is a sectional elevational view taken along III—III of FIG. 1.
Figure 4:
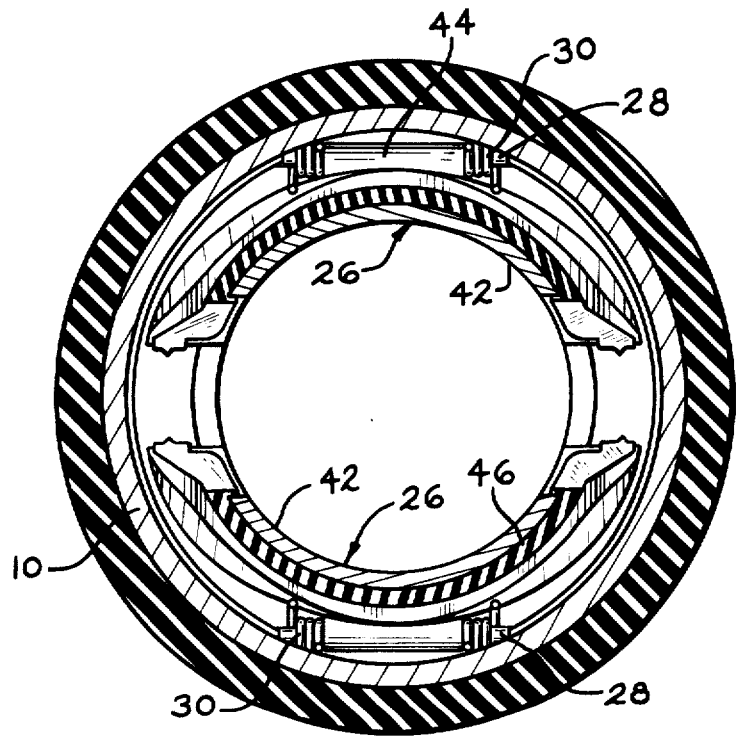
FIG. 4 is a sectional elevational view taken along IV—IV of FIG. 2.
Figure 5:
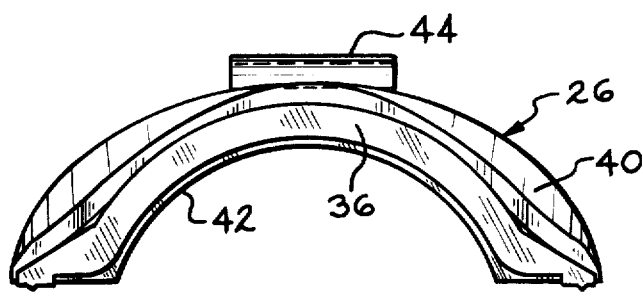
FIG. 5 is an end view of a valve element as if viewed from the left of FIG. 2.
Figure 6:
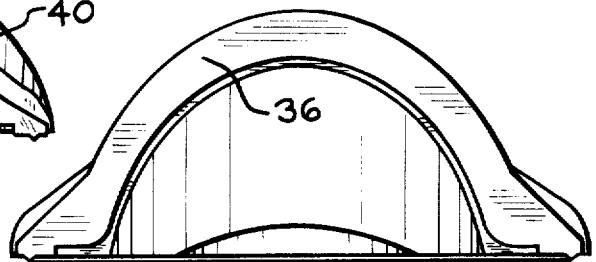
FIG. 6 is a view of a valve element as taken along VI—VI of FIG. 2.
Figure 7:
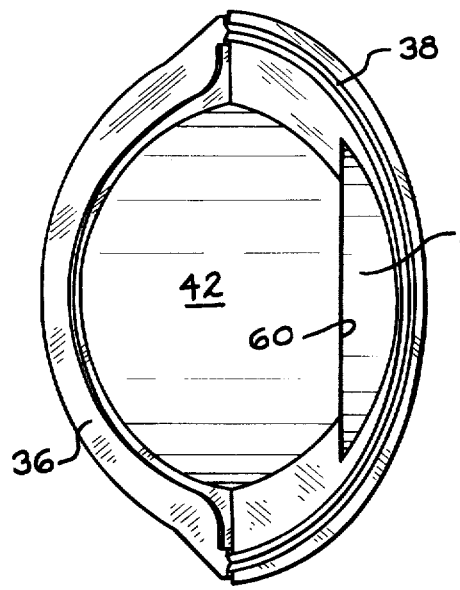
FIG. 7 is a view of a valve element as taken along VII—VII of FIG. 2, the male coupling component being omitted.
Figure 8:
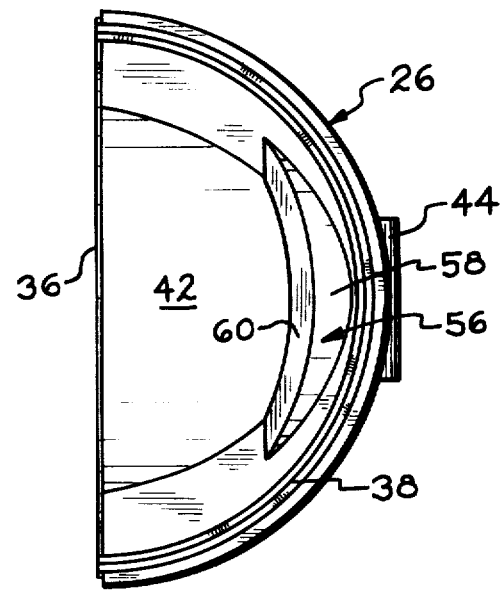
FIG. 8 is a view of a valve element as taken in the direction of VIII—VIII of FIG. 1.

The valve elements 26 are of identical configuration and are formed of metal, usually being diecast. The configuration of the valve elements is best appreciated from FIGS. 1–8 and each valve element is of a generally semi-conical configuration having a mating edge 36 and a seating edge 38, these edges being perpendicularly related to each other. The exterior surface 40 of the valve elements is of a convex configuration as will be apparent from FIGS. 3–5 and the inner surface 42 constitutes a segment of a cylinder having a diameter substantially equal to the minimum diameter of the fluid passage defined through the coupling. The pivot pin 28 extends through a hole defined in the boss 44 integrally formed on the valve element and the boss extends from the general configuration of the valve element, as will be appreciated from FIGS. 1 and 5.

A resilient sealing material 46, such as rubber, neoprene, or the like, is firmly bonded to the mating and sealing edges of the valve elements. In this respect, a groove 48 is defined in the semi-circular configuration of the valve element seating edge 38 for receiving the resilient seal, and the seal material further defines the mating edge 36 of the valve elements, as will be apparent in FIG. 6.

The resilient sealing material 46 also extends upon the shoulder surface 50 defined upon the exterior convex side of the valve elements, as apparent in FIGS. 1 and 2, and is bonded to the valve element material. This resilient material forms a bumper 52 which engages the cylindrical passage surface 54, FIG. 2, when the valve elements are pivoted slightly beyond their fully opened condition as shown in FIG. 2, and such need for shock absorption may occur during the initial inserting of the male half 12 into the female half 10.

Each valve element 26 is provided with an abutment recess 56 adjacent its pivot pin and inwardly radially spaced from the associated pivot. The configuration of the recess is best appreciated from FIGS. 1, 7 and 8, and the recesses include a cylindrical surface 58 which is disposed concentric to the coupling axis when the valve elements are in the fully open position. The recesses also include an abutment surface 60 which is disposed at right angles to the coupling axis when the valve elements are fully open, as shown in FIG. 2. The cooperation of the recesses 56 with the nose of the male half is more fully described below.

The male coupling half 12 includes an outer cylindrical stepped surface corresponding in configuration to the passage 18 of the female coupling half. The half 12 also includes a nose 62 threaded into the half 12 which is of a tubular configuration having a slightly enlarged extremity at 64. An annular ball detent receiving groove 66 is formed in the half 12 which is in axial alignment with the holes 22 when the coupling halves are fully engaged.

Latching of the coupling halves is achieved by a ball detent system. A plurality of radially displaceable balls 68 are mounted within the holes 22, and are of a diameter slightly greater than the minimum diameter of the conical holes 22 whereby inward radial movement of the balls is limited to the relationship apparent in FIG. 1. An axially slidable sleeve 70 of an annular configuration is mounted upon the coupling half 10 and includes a cylindrical ball detent positioning surface 72, and a cam surface 74. The exterior configuration of the sleeve 70 includes an operating ring 76, which may be formed of rubber, if desired, which readily permits the sleeve to be grasped and axially displaced when the locking sleeve has been shifted to the release position. Movement of the sleeve 70 to the right, FIG. 1, is limited by engagement of the oblique cam surface 74 with the snap wire ring 78 received within a groove adjacent the right end of the half 10.

Figure 9:
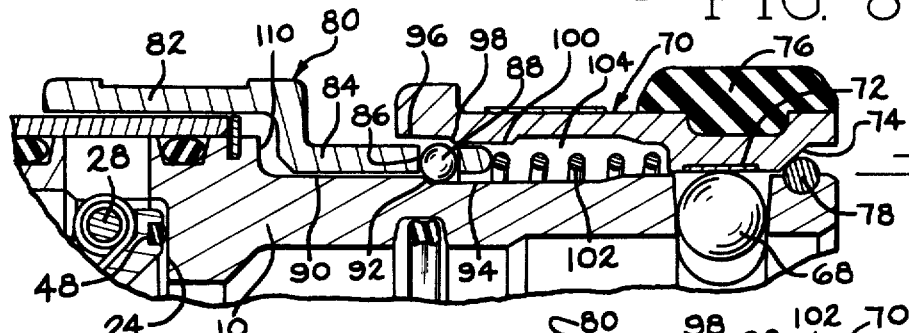
FIG. 9 is an enlarged, detail, elevational sectional view of the coupling latch structure illustrating displacement of the safety sleeve to permit actuation of the coupling latch sleeve, and prior to displacement of the latter.
Figure 10:
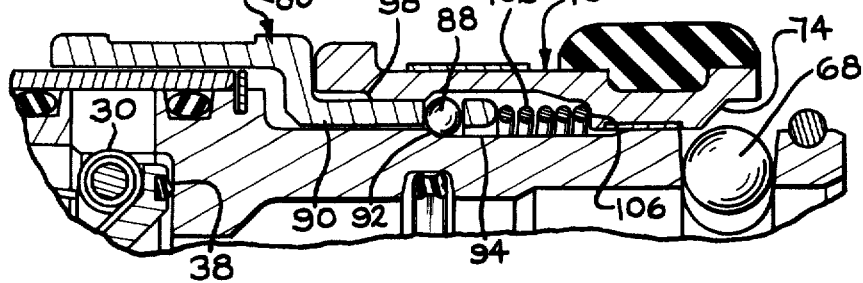
FIG. 10 is an illustration similar to FIG. 9 illustrating complete displacement of the latch sleeve to the left to permit uncoupling of the coupling halves.

Actuation of the latching sleeve 70 is controlled by a safety sleeve 80 mounted upon the exterior surface of the coupling half 10. The safety sleeve 80 includes a portion 82 which may be exteriorly grasped by the operator and an annular cylindrical portion 84 extends under the sleeve 70, FIG. 2. The portion 84 includes a plurality of radially disposed holes 86 each receiving a ball detent 88. As best illustrated in FIGS. 9 and 10, it will be noted that the half 10 includes a cylindrical ball positioning surface 90 and an annular shoulder 92 extending to a reduced diameter surface 94. The latch sleeve 70 includes an inner cylindrical surface 96, an oblique abutment shoulder surface 98, and a cylindrical surface 100, and the radial clearance between the surfaces 90 and 96, and 94 and 100 is only slightly greater than the diameter of the ball detents 88.

A compression spring 102 is located within the recess clearance 104 of the sleeve 70, and the ends of the spring engage the end of the safety sleeve portion 84 and the surface 106 defined on the latching sleeve 70. Thus, the spring 102 simultaneously biases the latching sleeve 70 toward the right and biases the safety sleeve 80 toward the left.

In use, assuming the coupling halves 10 and 12 to be fully connected, as shown in FIG. 2, the nose protuberance surface 64 will be engaging the valve element recess surfaces 58 holding the valve elements 26 in the fully open position illustrated. As the recess surfaces 58 are disposed slightly to the left of the pivot pins 28 the engagement of the recess surfaces with the nose surface 64 will assure that the valve elements are held in the fully open position against the biasing force of the springs 30, and it will be appreciated that the nose passage surface 108 aligns with the inner surface 42 of the valve elements. Thus, the valve elements produce no flow restriction through the coupling.

When the coupling halves are fully interconnected the ball detents 68 are received within the groove 66, and maintained therein as the sleeve 70 is in its rightmost position disposing the surface 72 over the balls preventing radial outward movement thereof in the well known manner. As apparent in FIG. 2, the ball detents 88 will be located upon the surface 90, and the spring 102 will have biased the safety sleeve 80 to its leftmost position.

When it is desired to disengage the coupling halves, the usual procedure, in the absence of the safety sleeve 80, would be to displace the latching sleeve 70 to the left, FIG. 2, in order to release the detent balls 68. However, such a displacement of the sleeve 70 is prevented as the abutment shoulder 98 will engage the outer portions of the ball detents 88 and the sleeve 80 cannot be moved to the left due to its engagement with shoulder 110.

In order to permit actuation of the sleeve 70 to permit uncoupling of the coupling halves, the safety sleeve 80 must first be displaced to the right to the position shown in FIG. 9. This displacement of the sleeve 80 to the right is made against the biasing force of the spring 102 and is possible because the axial extent of the portion 84 is great enough to permit the ball detents to move over the shoulder 92 into alignment with the surface 94. Upon this positioning of the safety sleeve being achieved, the latch sleeve 70 may now be shifted to the left, FIGS. 9 and 10, and such leftward displacement causes the abutment shoulder 98 to bias the ball detents 88 inwardly permitting the latch sleeve to ride over the detents further compressing the spring 102. Leftward movement of the latch sleeve 70 continues until the ball detents 68 are in alignment with the cam surface 74 and, thus, may be radially outwardly displaced from the groove 66 to permit the male half 12 to be withdrawn from the coupling half 10.

Removal of the half 12 from the half 10 permits the valve elements 26 to pivot toward their closed position and as the pressurized fluid is supplied from the left of the coupling, FIGS. 1 and 2, the fluid flow will augment the closing action of the valve elements. The valve elements will continue closing until the relationship shown in FIG. 1 is achieved wherein an engagement of the resilient sealing material on the mating edges 36 of the valve elements is achieved and the sealing material on the seating edges 38 engages the annular seat 24. The axial dimension of the male half surface 112 is sufficient that a sealed relationship between the coupling halves occurs during disconnection of the halves because of the O-ring 20 and only a small portion of fluid will escape during coupling half disengagement.

To interengage the coupling halves the previously described process is repeated. The normal or "at rest" condition of the connection sleeves is shown in FIG. 1 as the spring 102 will bias the sleeve 70 to the right and upon the sleeve 80 being located as in FIG. 1 the sleeve 80 may move to the left as the detents 88 ride up over the cam surface 92. Thus, in order to permit the male coupling half 12 to be inserted into half 10 the safety sleeve 80 must be moved to the right and then the latch sleeve 70 is moved to the left in order to permit outward displacement of the ball detents 68 as the half 12 enters the half 10. The nose protuberance 64 will engage the recesses 56 and the valve elements pivot to the fully opened position as shown in FIG. 2 during the final stages of coupling and once the groove 66 is aligned with the detents 68 coupling is completed by releasing the sleeve 70 and permitting the spring 102 to bias the sleeves into the coupled position of FIG. 2.

As the operating movements of the sleeves 70 and 80 are in opposite directions, it will be appreciated that inadvertent uncoupling is most unlikely.

Various modifications to the inventive concepts may be apparent to those skilled in the art without departing from the spirit and scope of the invention.

We claim:

1. A valved coupling characterized by its ability to convey high fluid capacities with low flow resistance comprising, in combination, a first body half having a passage defined therein having an inlet end and a connecting end, a second body half having a passage defined therein having an outlet end and an inlet end, said second body half including an annular tubular nose concentric with its associated passage inlet end receivable into said first body half passage connecting end and having a cylindrical passage, connecting means defined upon said body halves interengaging upon said body halves being coupled, a plurality of valve elements pivotally mounted in said first body half passage pivotal between open and closed positions, pivot means pivotally supporting said valve elements on said first body half, each of said valve elements comprising an arcuate cross-sectional segment having an inner surface of a substantially cylindrical configuration of a radius substantially equal to the radius of said nose cylindrical passage, a nose abutment recess defined in each of said valve elements adjacent the associated pivot means and radially inwardly spaced therefrom, said second body half nose engaging and being received within said recesses upon said body halves being coupled maintaining said valve elements in said open position whereby said second body half cylindrical passage and valve element inner surfaces define a substantially cylindrical nonrestricted flow passage through the coupling.

2. In a valved coupling as in claim 1, said recesses being of an arcuate configuration each having a circumferential cross-section defining a V-configuration and including a first surface disposed substantially perpendicular to the first body half passage and a second surface concentric to the passage axis engaging said nose when said halves are fully coupled.

3. In a valved coupling as in claim 1 wherein a pair of valve elements are mounted in said first body half, the pivot means of said valve elements being diametrically positioned with respect to each other relative to the associated passage, each of said valve elements closing one half of said first body half passage when in the closed position, and resilient sealing edges defined upon said valve elements.

4. In a valved coupling as in claim 3 wherein each valve element includes a mating edge and a seating edge, resilient sealing means defined upon each of said edges, an annular seat defined upon said first body half circumscribing said passage thereof, said valve elements sealing means defined upon said seating edges engaging said seat and said sealing means defined on said mating edges engaging upon said valve elements pivoting to said closed position.

5. In a valved coupling as in claim 4 wherein said mating and seating edges are planar and the edges of a common valve element are substantially perpendicular to each other.

6. In a valved coupling as in claim 5 wherein said valve elements each include a resilient bumper defined on said valve element adapted to engage the wall of said first body half passage upon excessive movement of said valve element when pivoting from the closed position to the open position.

7. In a valved coupling as in claim 6 wherein said valve elements are formed of metal and said sealing means and bumper are bonded upon said valve element metal, said bumper and sealing means of a common valve element being homogeneous.

8. In a valved coupling as in claim 1 wherein said connecting means comprises first latch means movably mounted upon said first body half between coupling and uncoupling positions, safety latch means mounted upon said first body half adjacent said first latch means movable between safety and release positions, abutment means defined on said first body half engaging said safety latch at said safety position thereof, said safety latch means including detent means selectively engaging said first latch means whereby said first latch means may only be translated from said coupling position to said uncoupling position upon said safety latch means being in said release position, and spring means biasing said safety latch means toward said safety position.

9. In a valved coupling as in claim 8 second abutment means defined on said first body half limiting movement of said first latch at said coupling position, said spring means being interposed between said first and safety latches whereby said spring also biases said first latch means toward said coupling position.

10. In combination, first and second coupling halves adapted to be coupled and uncoupled upon relative axial movement to each other, a first latch mounted upon said first half axially movable between coupled and uncoupled positions, first manual graspable means defined on said first latch for manual operation thereof, said first latch including a first detent engaging said second half to maintain said halves coupled when fully interconnected, first abutment means defined on said first half engaging said first latch at said coupled position, a safety latch mounted upon said first half axially movable between safety and release positions, second manual graspable means defined on said safety latch for manual operation thereof, second abutment means defined on said first half engaging said safety latch at said safety position, said safety latch including a second detent selectively engaging said first latch preventing movement thereof from said coupled position to said uncoupled position when in said safety position and permitting such movement when in the release position, and spring means biasing said safety latch toward said safety position, the direction of movement of said first latch from said coupled to said uncoupled positions being opposite to the direction of movement of said safety latch from said safety to said release positions.

11. In a combination as in claim 10 wherein said spring means is interposed between said first and safety latches whereby said spring also biases said first latch toward said coupled position.

12. In a combination as in claim 10 wherein said latches constitute locking ball detent actuating sleeves, a first set of radially displaceable locking ball detents mounted on said first body half actuated by said first latch sleeve selectively engageable with said second body half upon said halves being coupled, and a second set of radially displaceable locking ball detents mounted in said safety latch sleeve actuated by cam means defined on said first body half to selectively engage said first latch sleeve.

13. In a combination as in claim 12 wherein said safety latch sleeve is axially moved toward said first latch sleeve to move from said safety latch sleeve to said release position and said first latch sleeve is axially moved toward said safety latch sleeve to move from said coupled to said uncoupled position.

* * * * *